Apr. 10, 1923
V. A. FYNN
SPEED REGULATING APPARATUS
Filed July 5, 1919
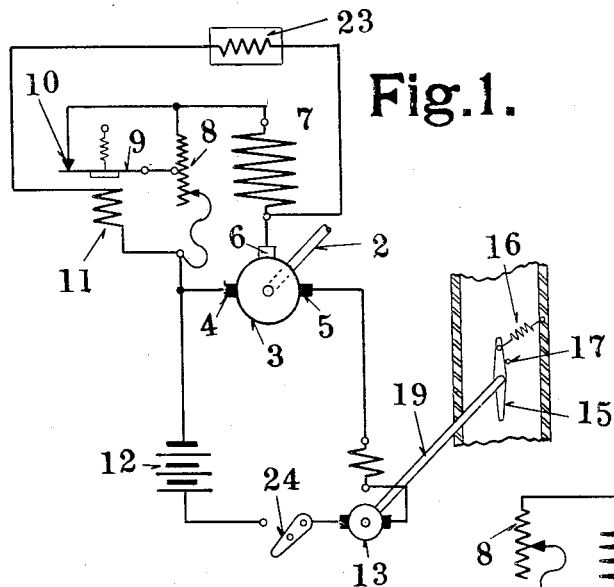
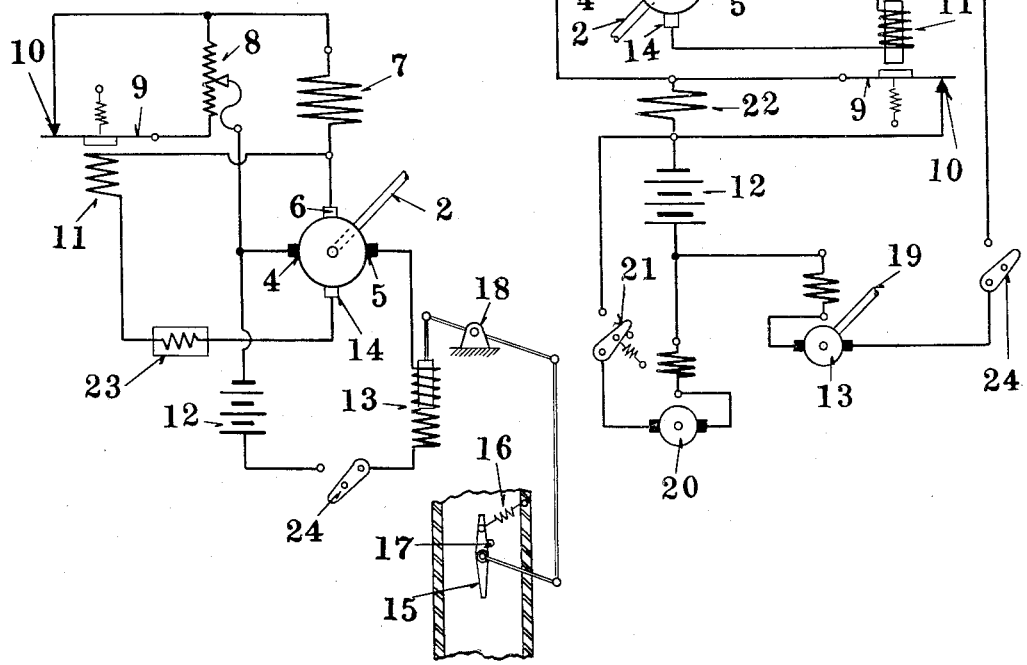
INVENTOR
Valère A. Fynn
BY E. E. Huffman
ATTORNEY Patented Apr. 10, 1923.

1,451,502

UNITED STATES PATENT OFFICE.

VALÈRE A. FYNN, OF ST. LOUIS, MISSOURI, ASSIGNOR, BY MESNE ASSIGNMENTS, TO WAGNER ELECTRIC CORPORATION, OF ST. LOUIS, MISSOURI, A CORPORATION OF DELAWARE.

SPEED-REGULATING APPARATUS.

Application filed July 5, 1919. Serial No. 308,868.

*To all whom it may concern:*

Be it known that I, VALÈRE A. FYNN, a subject of the King of England, residing at the city of St. Louis, State of Missouri, United States of America, have invented a certain new and useful Speed-Regulating Apparatus, of which the following is such a full, clear, and exact description as will enable any one skilled in the art to which it appertains to make and use the same, reference being had to the accompanying drawings, forming part of this specification.

My invention relates to speed controlling systems for prime movers, particularly for internal combustion engines which make use on an electromagnetic control for the supply of energy to the throttle valve of the prime mover. In systems of this kind, the electromagnetic throttle valve controller is usually in circuit with a generator driven by the prime mover and the regulation is generally the closer the more rapidly the terminal voltage or the current output of said generator changes with changing speed. In order to secure this rapid change, it is desirable to make use of some kind of compound generator. When a generator of this type is used in conjunction with a storage battery, it readily happens that the polarity of the generator is reversed, thus causing same to generate an E. M. F. in the same direction as that of the storage battery. This reversal is all the more likely to occur when the speed of the prime mover is adjusted by adjusting the excitation of the generator as is usual. This condition is undesirable and it is the object of this invention to prevent such reversal. My invention is therefore applicable to battery charging generators as well as to speed controlling systems in which a battery and generator are used.

In carrying out my invention, I derive from the armature of the generator an E. M. F., the magnitude of which depends on the current output of said generator and on its speed, and I provide means, controlled by this E. M. F., which prevent the reversal in question, either by reducing the resistance in the field circuit, or by shortcircuiting the series winding in case an ordinary compound generator is used.

My invention will be better understood by reference to the accompanying drawings in which Figs. 1 and 2 show my invention as applied to a compound generator of the Sayers, or three brush type, while Fig. 3 illustrates its application to an ordinary compound wound generator.

Referring to Fig. 1, the prime mover drives the shaft 2 on which is mounted the armature 3 of the generator. This armature is provided with main brushes 4, 5 located in, or near the neutral zone as is usual, and with an auxiliary brush 6. In normal operation the voltage between this auxiliary brush and one of the main brushes will increase with increasing load and speed, while the voltage between said auxiliary brush and the other main brush will decrease under the same conditions. The exciting winding 7 is connected between the auxiliary brush 6 and that main brush 4 between which the E. M. F. increases with load and speed, and an adjustable resistance 8 is included in this exciting circuit. A normally closed relay 9, 10, 11 is connected to shortcircuit a part of the adjustable resistance 8 and the exciting coil 11 of said relay is connected to the brushes 4 and 6, with the interposition of a resistance 23 having a high temperature coefficient.

The electromagnetic controller 13 is here shown in the form of a series motor coupled by means of the shaft 19 to the throttle valve 15 which is normally held open by the spring 16. This controller is connected in circuit with the storage battery 12 and the main brushes 4 and 5 of the generator.

The operation of this device is as follows: When the prime mover is being started, or after it has been started, the switch 24 may be closed. If the generator 3 is at rest or revolving at a slow speed, the battery will discharge through it and the voltage across the brushes 4 and 6 will be smaller than the battery voltage. The relay coil 11 is so proportioned that this voltage will not open the short circuit around part of the adjustable resistance 8 and the excitation of the generator will, in consequence, be such as to prevent reversal, even though the movable contact cooperating with this resistance is in that extreme position in which all of said resistance is included in the circuit of the winding 7, or would be so included if it were not for the shortcircuiting relay 9, 10. As the speed increases, the discharge current falls to zero and the generator begins to charge the battery. The controller operates between certain values of this charging current, closing the valve 15 with increasing charging current. Provided the generator does not reverse, the E. M. F. at the brushes 4, 6 will not vary greatly until the generator begins to deliver a charging current. Although the discharge current at stand still may be large, yet the speed is then zero and the E. M. F. at the brushes 4, 6 is only such as can be impressed on these brushes by the battery 12. As the speed increases, the discharge current decreases and this prevents the speed E. M. F. at the brushes 4, 6 from rising materially. When the generator is charging the battery, the speed is always considerable and the E. M. F. at the brushes 4, 6 due to the armature current and speed quickly rises. The coil 11 is so adjusted as to open the shortcircuit around a portion of the adjustable resistance 8 a little before the charging current reaches the value at which the electromagnetic controller begins to operate. As soon as this occurs, the excitation is entirely determined by the position of the movable contact cooperating with 8 and the prime mover assumes the speed corresponding to the position of said contact. Should the engine get overloaded and the speed drop to an extent sufficient to reduce the charging current to a value well below the lowest at which the electromagnetic controller begins to respond, then the voltage at the brushes 4, 6 also falls to a low value and the coil 11 releases the armature 9 thus shortcircuiting part of the resistance 8 and boosting the charging current. As a matter of fact, the armature 9 will vibrate under these conditions and the frequency of these vibrations will adjust itself so as to prevent the charging current from falling below a predetermined value.

The relay 9, 10 can of course be so connected as to shortcircuit all of the regulating resistance 8, but it is better to shortcircuit just enough of this resistance to prevent reversal, thus reducing the maximum voltage to be dealt with at the contacts of the relay. Because the voltage at the brushes 4, 6 varies within very wide limits and the coil 11 must be set to open the shortcircuit at one-third, or perhaps one-fourth of the maximum voltage, it is advisable to connect in circuit with said coil a resistance such as 23 having a high temperature coefficient and adjusted to prevent the current in 11 from exceeding a certain value.

The arrangement shown in Fig. 2 differs from that just described in that all of the regulating resistance 8 is shortcircuited by the relay and in that the relay operating voltage is taken from auxiliary brushes 6, 14 displaced by ninety electrical degrees from the main brushes 4, 5. In this arrangement the current through the armature 3 reverses, but is also dependent on the armature current and speed, being zero when the current or the speed is zero. The electromagnetic controller is here shown in the form of a solenoid.

In Fig. 3 the exciting winding 7 is connected to the main brushes 4, 5 with the interposition of an adjustable resistance 8 and operates like an ordinary shunt winding, but the machine carries a series exciting winding 22 in circuit with the storage battery 12 and the controller 13. The relay 9, 10 normally short circuits the series winding 22, but when under the influence of speed and charging current, the voltage at the brushes 6, 14 reaches a predetermined value, the coil 11 interrupts this shortcircuit and renders the series winding operative. The adjustments are so made that the shortcircuit around 22 is interrupted at all speeds by a charging current which is a little lower than that at which the electromagnetic controller begins to operate. It is obvious that the higher the speed for which the generator is set by means of the adjustable resistance 8, the lower the charging current value at which the shortcircuit around 22 will be interrupted. In Fig. 3 is shown a cranking motor 20 controlled by a starting switch 21, which motor can be used to build the prime mover up to speed.

Having fully described my invention, what I claim as new and desire to secure by Letters Patent of the United States is:

1. The combination of a dynamo electric machine, means for driving said machine, a storage battery connected to the dynamo electric machine to be charged thereby, and means for controlling the excitation of the dynamo to prevent permanent reversal of its polarity.

2. The combination of a dynamo electric machine, means for driving said machine, a storage battery connected to the dynamo electric machine to be charged thereby, and means controlled by the product of speed and current output of said dynamo to prevent reversal of polarity of the dynamo.

3. The combination of a dynamo electric machine, means for driving said machine, a storage battery connected to the dynamo electric machine to be charged thereby, and means controlled by the product of the speed and charging current of the dynamo for increasing the excitation of said dynamo to prevent said charging current from falling below a predetermined value.

4. The combination of a generator provided with an exciting circuit, a storage battery connected to the generator to be charged thereby, and means controlling the excitation of the generator, said means comprising a controlling circuit connected to the generator armature along an axis displaced from the axis of the circuit including the storage battery.

5. The combination of a generator provided with an exciting circuit, a storage battery connected to the generator to be charged thereby, means controlling the excitation of the generator, said means comprising a controlling circuit connected to the generator armature along an axis displaced from the axis of the circuit including the storage battery, and means controlled by said controlling circuit for varying the excitation of the generator.

6. The combination of a generator provided with an exciting circuit, a storage battery connected to the generator to be charged thereby, means controlling the excitation of the generator, said means comprising a controlling circuit connected to the generator armature along an axis displaced from the axis of the circuit including the storage battery, and a resistance in said controlling circuit having a high temperature coefficient.

In testimony whereof, I have hereunto set my hand and affixed my seal.

VALÈRE A. FYNN. [L. S.]